(12) United States Patent
Altman (10) Patent No.: US 12,123,664 B2
(45) Date of Patent: Oct. 22, 2024

(54) TANK AND TUBE ASSEMBLY FOR A HEAT EXCHANGER

(71) Applicant: VALEO SYSTEMES THERMIQUES, La Verriere (FR)

(72) Inventor: Steve Altman, Troy, MI (US)

(73) Assignee: Valeo Systemes Thermiques, La Verriere (FR)

( * ) Notice: Subject to any disclaimer, the term of this patent is extended or adjusted under 35 U.S.C. 154(b) by 47 days.

(21) Appl. No.: 18/050,870

(22) Filed: Oct. 28, 2022

(65) Prior Publication Data

US 2024/0142183 A1     May 2, 2024

(51) Int. Cl.
*F28F 9/02*     (2006.01)

(52) U.S. Cl.
CPC .......... *F28F 9/0224* (2013.01); *F28F 9/0265* (2013.01)

(58) Field of Classification Search
CPC .......... F28F 9/0224; F28F 9/0265; F28F 9/12; F28F 9/06; F28F 9/0239; F28F 9/0229; F28F 9/002
USPC ........................................ 165/174
See application file for complete search history.

(56) References Cited

U.S. PATENT DOCUMENTS

| | | | |
|---|---|---|---|
| 7,578,340 B2 * | 8/2009 | Forster | F28F 9/0214 165/173 |
| 9,644,868 B2 | 5/2017 | Grunwald et al. | |
| 10,168,109 B2 * | 1/2019 | Riondet | F28F 9/0224 |
| 10,944,137 B2 | 3/2021 | Yamagishi et al. | |
| 11,230,964 B2 * | 1/2022 | Tan | F28F 9/0248 |
| 11,662,160 B2 | 5/2023 | Dolderer et al. | |
| 2002/0023743 A1 * | 2/2002 | Jung | F28F 9/0221 165/173 |
| 2010/0108303 A1 | 5/2010 | Sundralingam et al. | |
| 2010/0108304 A1 * | 5/2010 | Nies | F28F 9/0229 165/173 |
| 2013/0189557 A1 | 7/2013 | Haussmann | |
| 2021/0119280 A1 | 4/2021 | Schwarz et al. | |
| 2022/0065555 A1 * | 3/2022 | Thomsen | F28F 9/14 |

FOREIGN PATENT DOCUMENTS

| | | | | |
|---|---|---|---|---|
| CN | 111220017 A | 6/2020 | | |
| DE | 102016218088 A1 | 3/2018 | | |
| EP | 1870658 A1 | 12/2007 | | |
| EP | 2411754 B1 * | 6/2017 | .......... | F28D 7/1684 |
| FR | 3066260 A1 | 11/2018 | | |
| JP | H07305983 A | 11/1995 | | |

(Continued)

OTHER PUBLICATIONS

European Patent Office, International Search Report and Written Opinion of corresponding International Application No. PCT/EP2023/080055, dated Feb. 27, 2024.

*Primary Examiner* — Jon T. Schermerhorn, Jr.
(74) *Attorney, Agent, or Firm* — Valeo Systemes Thermiques (57) ABSTRACT

A thermal control device has a thermal control device base, a connection block attached to the thermal control device and a tubing for a heat exchange fluid attached to the connection block. The tubing has a tubing extension axis and a tubing side wall. The connection block includes a connection block receiving section, which receives a part of the tubing side wall. The connection block is configured to facilitate heat exchange between the tubing side wall and the thermal control device.

19 Claims, 11 Drawing Sheets

(56) References Cited

FOREIGN PATENT DOCUMENTS

| JP | H09126684 A | 5/1997 | | |
| WO | WO-2010108992 A1 | * | 9/2010 | ........... F28D 7/1684 |
| WO | WO-2010149452 A1 | * | 12/2010 | ........... F28D 1/0408 |
| WO | WO-2018060625 A1 | * | 4/2018 | .............. F28F 1/025 |

* cited by examiner

TANK AND TUBE ASSEMBLY FOR A HEAT EXCHANGER

TECHNICAL FIELD

The present invention relates to heat exchangers used for cooling batteries in electric and/or hybrid vehicles. More particularly, it pertains to a tank and tube assembly for a heat exchanger for cooling battery cells.

BACKGROUND OF THE INVENTION

Thermal management system is vital for efficient operation of a battery pack in vehicles such as electric vehicles and hybrid-electric vehicles. The battery pack is an energy source of such a vehicle and provide required power to traction motors and other electric and/or electronic components. The battery pack includes a plurality of rechargeable battery cells and has a narrow operating temperature range, therefore the battery pack must be maintained within that specified operating temperature range to operate efficiently. During hot conditions and/or vehicle operating conditions, the battery pack needs to be cooled to maintain the temperature within the specified operating temperature range, whereas in cold conditions, the battery pack need to be warmed to reach the optimum temperature. Deviation of battery pack's temperature from the specified temperature range can impede battery pack performance and reduce battery charge efficiency and durability. Sometimes, the batteries can be permanently damaged or destroyed due to deviation of the battery pack temperature outside the specified temperature range, and overheating of the battery cells can even result in fires and other safety related issues.

Typical thermal management system to cool and heat the battery pack relies on a number of subsystems such as a chiller, air-to-fluid heat exchanger, electric heater etc. The chiller or air-to-fluid heat exchanger are adapted for cooling the heat exchange fluid such as refrigerant or coolant in a battery loop to cool the battery pack, while the electric heater is adapted for heating the heat exchange fluid in the battery loop to increase the temperature of the battery pack.

Generally, heat exchangers can include multiple thermal cooling tube arrangements for cooling battery cells of the battery pack. Such a thermal cooling tube arrangement include a thermal cooling tube with two sets of channels/micro-channels through which fluid/coolant circulates, an entry/exit tank at one end of the cooling tube, and a flow reversal tank at other end of cooling tube to allow the fluid to pass through the channels and follow the U-flow path. The thermal cooling tube arrangement is adapted for cooling of the battery cells that are indirectly in contact with the fluid/coolant circulating through the channels/micro-channels and following along a U-flow path. However, the existing end tanks of the exiting heat exchangers include complex component designs and complex joints, which increase the assembly time as well as manufacturing cost of the existing cooling tube arrangements or the heat exchanger.

Therefore, there is a need for a simple and robust end tank arrangement for thermal cooling tube, which can overcome the abovementioned problems associated with the existing end tanks of the exiting heat exchanger or the thermal cooling tube arrangement. Further, there is a need for a simple and cost-effective tank and tube assembly for U-flow cooling of battery cells of a battery pack.

BRIEF SUMMARY OF THE INVENTION

The present invention discloses an end tank for thermal cooling tubes of heat exchangers, which includes simple component design therefore lowering components manufacturing cost and simplifying assembly process, thereby obviating drawbacks of the conventional end tanks of the existing cooling tube arrangements.

The disclosed end tank includes simple joints thereby providing good joining/sealing repeatability as well as improving performance, reliability and service life of the end tank, consequently improving performance, reliability and service life of the thermal cooling tube assembly or the heat exchanger.

In accordance with an embodiment of the present invention, the disclosed tank includes at least two body members coupled to each other to define a chamber and an insert configured between the at least two body members to seal the corresponding chamber from at least one side. The insert includes at least one protrusion adapted to abut with at least one of the at least two body members to prevent further movement of the insert inside the chamber of the tank. The tank includes at least one connecting opening to form connection between the tank and a tubular element, e.g. a cooling tube made of a thermal conducting material and being a part of the heat exchanger. The connecting opening of the tank can be designed to receive and securely hold the corresponding end of the tubular element of the heat exchanger.

In an embodiment, each of the at least two body members can include a panel portion and at least one side wall portion extending from an end of the panel portion. Each of the at least two body members can further include a locking projection projected from the side wall portion and a slot present at a free end portion of the panel portion opposite to the at least one side wall portion. The locking projection of one of the at least two body members is adapted to engage with the slot of the other of the at least two body members to connect the at least two body members of the tank. The locking projections and the slots of the at least two body members are adapted to enable snap-fit locking therebetween.

In addition, the locking projection of each of the at least two body members can be inwardly biased to enable press locking between the at least two body members after engagement between the corresponding locking projections and the slots of the at least two body members.

Besides, a leading free end of the locking projection of each of the at least two body members can be bent outwardly to facilitate ease of being slid into a locking position with respect to the corresponding slot of the at least two body members.

In another embodiment, the at least one side wall portion of each body member can include a pair of side wall portions extended from the opposite ends of the respective panel portion. For instance, each body member can be substantially U-shaped. The pair of side wall portions of one of the at least two body members can be adapted to be received in other body member of the at least two body members such that the side wall portions of the at least two body members are engaged with each other to connect the at least two body members.

In an embodiment, at least one body member of the at least two body members can include a first opening for ingress of fluid with respect to the chamber of the tank and/or a second opening for egress of fluid with respect to the chamber of the tank.

In addition, the insert can include a hanging portion extended outwardly away from the tubular element. A dielectric coating can be applied on outer/external surfaces of at least one of the tank and the tubular element. This dielectric coating acts as an insulator.

In an embodiment of the present invention, the insert can be integrally formed with at least one of the at least two body members.

In another embodiment of the present invention, the insert can be a separate part with respect to the at least two body members. The insert can be fitted through an outer side opening defined between the at least two body members, wherein outer side opening is defined at an end opposite to the at least one connecting opening In addition, at least one of the at least two body members can include one or more flexible tabs to secure the insert inside the chamber after the insert is fitted through the outer side opening.

In an embodiment of the present invention, the insert can comprise a projection projected from an inner surface of the insert, facing towards the chamber. In addition, a free inner terminal of the projection is pointy.

In addition, the projection of the insert can divide the chamber of the tank into a first sub-chamber and a second sub-chamber.

In an embodiment, the projection can include a pair of concave surfaces on opposite sides to direct/guide the fluid to and from the first opening and second opening or chamber of the tank.

In accordance with another embodiment, the present invention discloses a tank and tube assembly for a heat exchanger. The disclosed tank and tube assembly includes a tubular element and at least one tank, such as the tank disclosed above, coupled to at least one end of the tubular element. The tubular element includes a plurality of channels, including a first set of channels and a second set of channels, configured in fluid communication with each other at one ends thereof to enable U-flow of a fluid through the tubular element. In addition, each tank can include at least two body members coupled to each other to define a chamber with at least one connecting opening configuring fluidic communication between the chamber and the plurality of channels of the tubular element, and an insert configured between the at least two body members to seal the corresponding chamber from at least one side.

In an embodiment of the present disclosure, the at least one tank can comprise a first tank and a second tank. In addition, at least one of the at least two body members of the first tank includes a first opening for ingress of fluid with respect to the chamber of the first tank and/or a second opening for egress of fluid with respect to the chamber of the first tank. Alternatively, one tank includes a first opening for ingress while the opposite tank includes a second opening for egress of the fluid, thereby enabling an I-flow through the tube and tanks assembly.

Further, the insert of the at least one tank, such as the first tank, can include a projection projected from an inner surface of the insert facing towards the chamber. The projection is adapted to block an inlet opening of at least one channel arranged between the first set of channels and the second set of channels of the tubular element. The outlet opening of the at least one channel can also be blocked to prevent ingress of the fluid. In an embodiment, a blocking element can be used to block an outlet opening of the at least one channel. In addition the blocking element can have a shape corresponding to the outlet opening of the at least one channel such that blocking element abut with the outlet opening.

Furthermore, the projection of the insert can divide the chamber of the at least one tank, such as the first tank, into a first sub-chamber and a second sub-chamber, wherein the first sub-chamber is adapted to distribute the fluid to the first set of channels and the second sub-chamber is adapted to collect fluid from the second set of channels.

In addition, the first set of channels and the second set of channels allow the fluid to circulate in opposite directions to facilitate U-flow of the fluid through the tank and tube assembly and air in the at least one channel arranged between the first and the second sets of channels create thermal insulation between the adjacent two channels.

Further, the second tank, that can be configured at a return end of the tube which is opposite to the end on which the first tank is configured, can act as a return tank, which returns or deviates the fluid circulating through the first set of channels into the second set of channels to enable U-flow of the fluid through the tubular element.

In the present description, some elements or parameters can be indexed, such as a first element and a second element. In this case, unless stated otherwise, this indexation is only meant to differentiate and name elements which are similar but not identical. No idea of priority should be inferred from such indexation, as these terms can be switched without betraying the invention. Additionally, this indexation does not imply any order in mounting or use of the elements of the invention.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

DETAILED DESCRIPTION OF THE INVENTION

It must be noted that the figures disclose the invention in a detailed enough way to be implemented, said figures helping to better define the invention if needs be. The invention should however not be limited to the embodiment disclosed in the description.

The present invention is explained in the forthcoming description and the accompanying drawings with an example of a tank and tube assembly for a heat exchanger, wherein the tank and tube assembly is formed by assembling a tubular member and one or more end tanks fitted to opposite ends of the tubular member to enable U-flow of a heat exchange fluid for cooling battery cells of an electric and/or hybrid vehicle. Each end tank includes simple component design, therefore lowering components manufacturing cost and simplifying assembly process. Further, each end tank includes simple joints, thereby providing good joining/sealing repeatability as well as improving performance, reliability and service life of the end tank. Furthermore, the disclosed tank and tube assembly facilitates low restrictive flow features and does not contribute significantly to pressure drop. Moreover, the disclosed tank and tube assembly can be easily retrofitted with battery cells in the battery pack, which leads to optimal space usage, i.e. efficient cooling tank and tube assembly density between the battery cells, with space clearance above and below the battery modules.

It is to be appreciated that the concept of the present invention is applicable for any other application in vehicular and non-vehicular environment, where it is required to use the cooling tube arrangement for cooling battery cells, and all such applications are within scope of the present invention without any limitations whatsoever.

Figure 1:
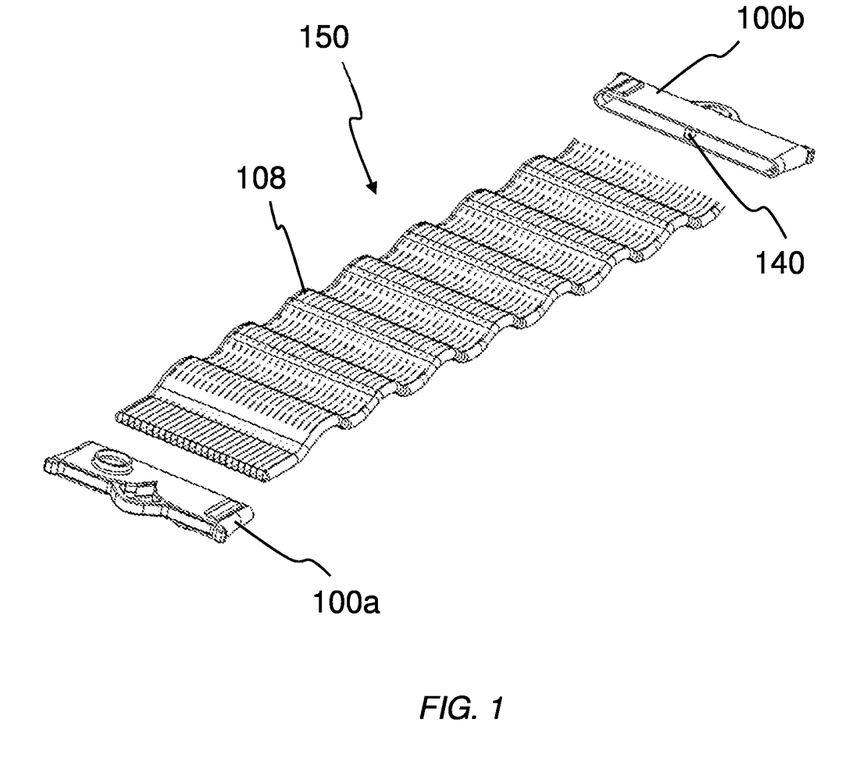
FIG. 1 illustrates an exploded view of a tank and tube assembly for a heat exchanger in accordance with an embodiment of the present invention.
Figure 2:
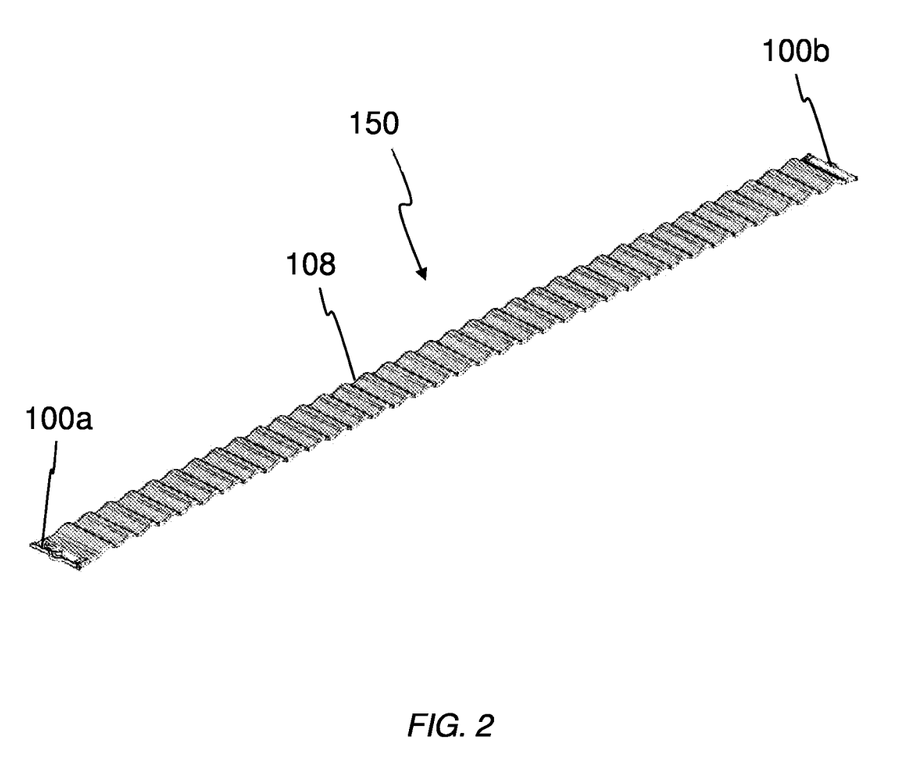
FIG. 2 illustrates an isometric view of a tank and tube assembly of FIG. 1.

Referring to FIG. 1 and FIG. 2, in accordance with an embodiment, the present invention discloses a tank and tube assembly 150 for a heat exchanger for cooling battery cells of a battery pack. For instance, the battery pack can be installed on an electric or hybrid vehicle, wherein the battery cells of the battery pack can be rechargeable cylindrical cells. The tank and tube assembly 150 includes a tubular element 108 including a plurality of channels including a first set of channels 136 and a second set of channels 138 which are configured in fluid communication with the first set of channels 136 at one ends thereof to enable U-flow of a fluid, such as a heat exchange fluid or coolant, through the tubular element 108 (as shown in detail in FIG. 6). The tank and tube assembly 150 further includes at least one tank such as a first tank 100a and a second tank 100b, both being adapted to be coupled to opposite ends of the tubular element 108. For instance, the first tank 100a is fitted at an inlet/exit end of the tubular element 108 through which the fluid inters and exits the first set of channels 136 and the second set of channels 138 respectively, whereas the second tank 100b is fitted at the other end or return end of the tubular element 108 such that fluid flowing through the first set of channels 136 is received in the second tank 100b and further the second tank 100b distributes the received fluid to the second set of channels 138 to enable the fluid to follow the U-flow path in the tubular element 108.

In addition, the tubular element 108 can be made of any suitable thermal conductive material and can be arranged such that the battery cells to be cooled can be indirectly in contact with the fluid/coolant circulating through the channels 136 and 138 along the U flow path. Thus, the fluid circulating through the tubular element 108 can extract heat from the battery cells and cool the battery cells. For instance, the tubular element 108 can be a wavy-tubular element. In another embodiment, the tubular element 108 can have any other suitable profile, such as flat tubular element.

Referring to FIG. 3A to FIG. 5, the first tank 100a includes two body members 102a and 102b which are coupled to each other to define a chamber 104a with an connecting opening 106a at an inner end of the first tank 100a, and an insert 110a that is configured between the at least two body members 102a and 102b at an outer end to seal the chamber 104a from one side, such as an outer end side. The connecting opening 106a of the first tank 100a is adapted to receive and securely hold the corresponding end of the tubular element 108. In addition, the chamber 104a of the first tank 100a and the plurality of channels 136 and 138 of the tubular element 108 are fluidically connected through the connecting opening 106a.

Figure 3A:
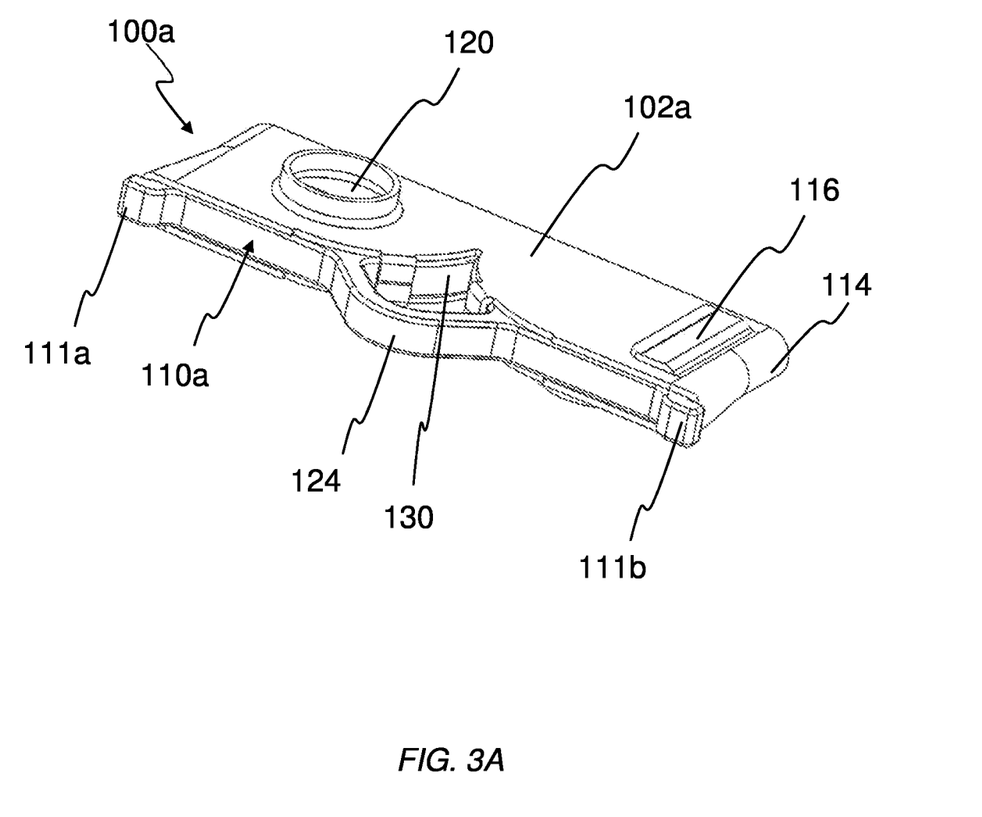
FIG. 3A illustrates a first isometric view of a first tank of the tank and tube assembly of FIG. 1.

In an embodiment, the first tank 100a can be coupled to the tubular element 108 though a joining process, such as but not limited to, a brazing process. In addition, inner surfaces of the body members 102a and 102b can be flux coated for brazing process.

Further, each of the body members 102a and 102b includes a panel portion 112, and at least one side wall portion, such as a wall portion 114 extended from an end of the panel portion 112. The sidewall portion 114 can be substantially U-shaped. In addition, each sidewall portion 114 can be tapered such that the width of the sidewall portion 114 decreases along a longitudinal axis of the tubular element 108 from the outer end to the inner end that is coupled to the tubular element 108. In other words, the width of the first tank 100a is smaller at the inner end, which is coupled to the tubular element 108, than the width at the outer end of the first tank 100a. In yet another words, the width of each body member 102a and 102b gradually decreases from the outer end to the inner end, which in effect gradually reduces width of the first tank 100a towards the inner end from the outer end.

Furthermore, each of the two body members 102a and 102b includes a locking projection 116 projected from the corresponding side wall portion 114 and a slot 118 created at a free end portion of the panel portion 112, wherein the slot 118 is located at the end opposite to the side wall portion 114. In addition, the locking projection 116 of one of the two body members 102a and 102b is adapted to engage with the slot 118 of the other of the two body members 102a and 102b to connect the two body members 102a and 102b of the first tank 100a.

In addition, the locking projections 116 and the slots 118 of the two body members 102a and 102b can be configured to enable snap-fit locking therebetween to lock the two body members 102a and 102b with each other. This snap-fit locking can help to keep them in place before the joining process, such as but no limited to, the brazing process, thereby maintaining the required shape of the first tank 100a until joining of the first tank 100a and the tubular element 108.

In an embodiment, the locking projection 116 of each of the body member 102a and 102b can be biased inwardly, i.e. towards the inner surface of the respective panel portion 112 or along an axis extending towards the chamber 104 and is perpendicular to a longitudinal axis as well as the transverse axis of the tank first 100a, in order to enable press locking between the two body members 102a and 102b after engagement between the corresponding locking projections 116 and the slots 118 of the two body members 102a and 102b.

Figure 3B:
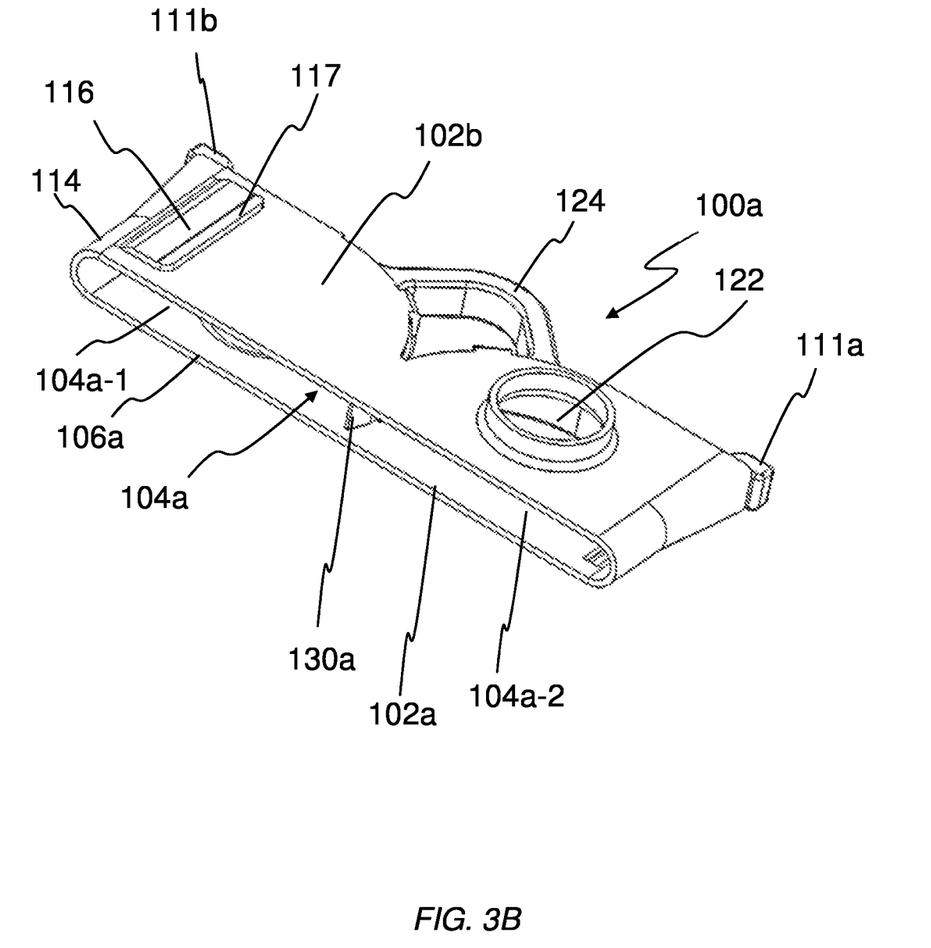
FIG. 3B illustrates a second isometric view of a first tank of the tank and tube assembly of FIG. 1.

As shown in FIG. 3B, a leading free end 117 of the locking projection 116 of each of the body member 102a, 102b can be bent outwardly, i.e. away from the outer surface of the tank 104a or along an axis extending away from the chamber 104 and is perpendicular to the longitudinal axis as well as the transverse axis of the first tank 100a, in order to facilitate ease of being slid into a locking position with respect to the slot 118 of the two body members 102a and 102b, this can reduce the effort required during assembly of the first tank 100a.

In an embodiment, at least one of the two body members 102a, 102b of the first tank 100a can include a first opening 120 for ingress of the fluid with respect to the chamber 104a of the first tank 100a and a second opening 122 for egress of the fluid with respect to the chamber 104a of the first tank 100a. For instance, as shown in FIG. 4 and FIG. 5, the panel portion 112 of the body members 102a is provided with the first opening 120 for ingress of fluid and the panel portion 112 of the other body members 102b is provided with the second opening 122 for egress of the fluid.

Figure 4:
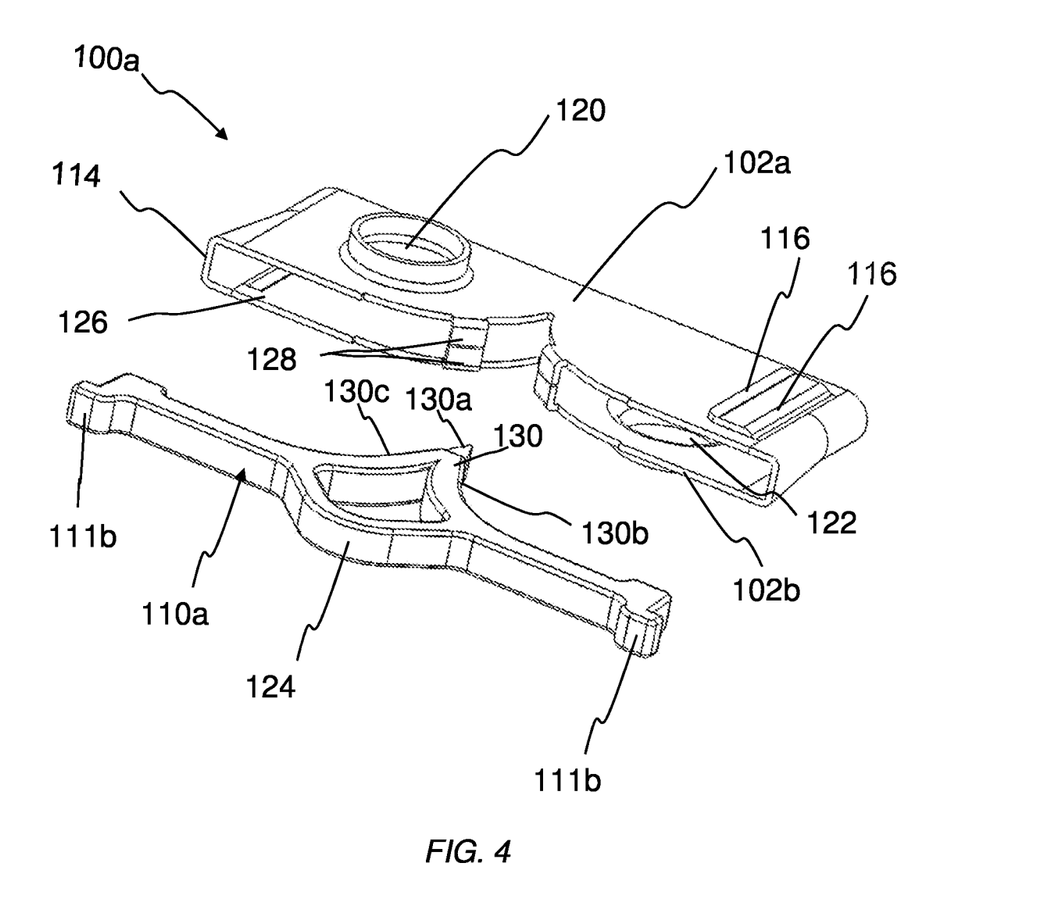
FIG. 4 illustrates a first exploded view of the first tank.
Figure 5:
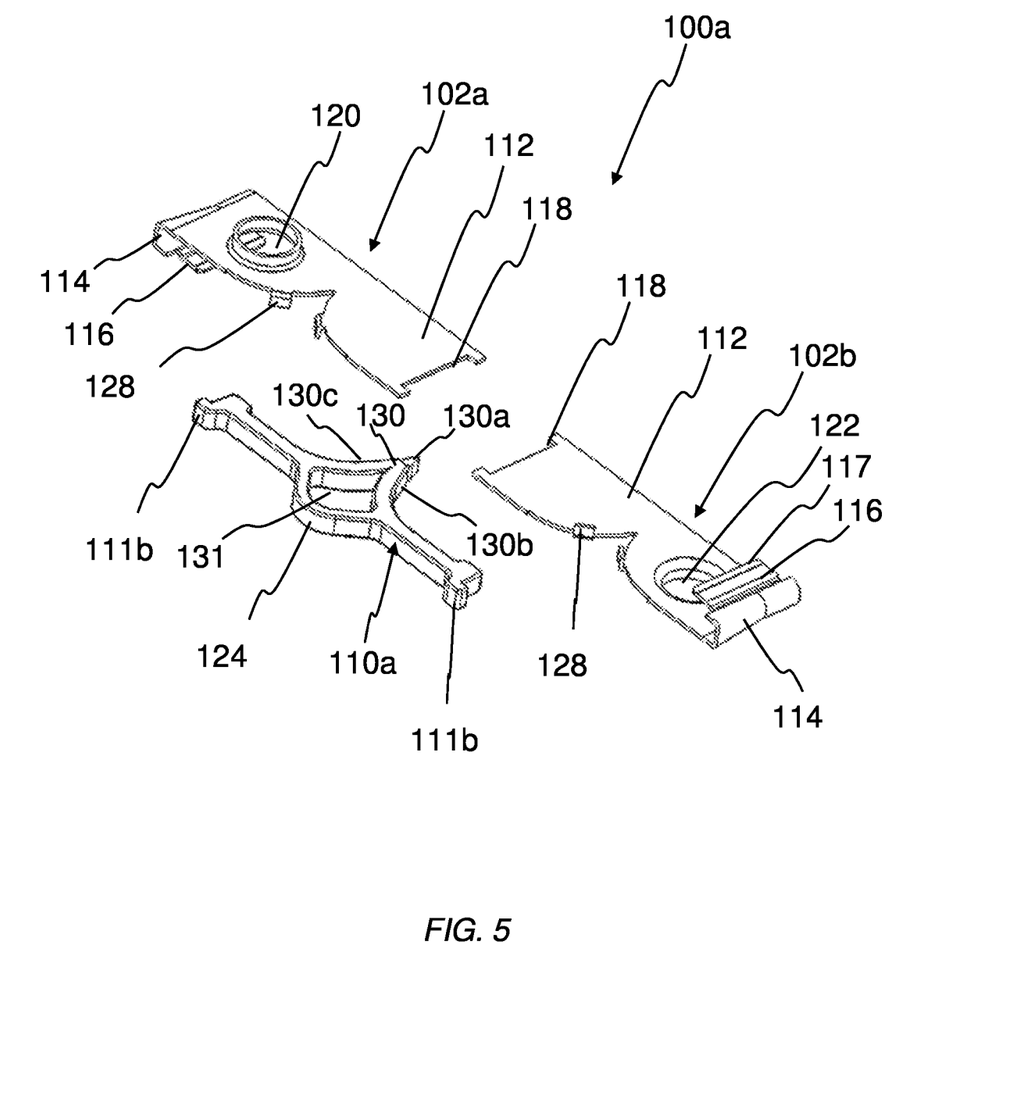
FIG. 5 illustrates a second exploded view of the first tank.

In an embodiment, as shown in FIG. 4 and FIG. 5, the insert 110a of the first tank 100a can be a separate part with respect to the two body members 102a and 102b and is adapted to be fitted in an outer side opening 126 defined between the two body members 102a and 102b at the outer end. Each of the body members 102a and 102b can be provided with flexible tabs 128 to secure the insert 110a inside the chamber 104a or with the respective body member after the insert 110a is fitted through the outer side opening 126 between the two body members 102a and 102b. Flexibility of the tabs 128 allows bending and unfolding of the tabs 128 to, respectively, secure and release the insert 110a.

Further, the insert 110a comprises a hanging portion 124 extended outwardly away from the tubular element 108. The hanging portion 124 can be used as a fixing feature to ensure the proper alignment of the first tank 100a with the tubular element 108. It can be used as a hanging feature, e.g. when a dielectric coating is applied on outer surfaces for electric insulation from the batteries. The dielectric coating can be applied on outer surfaces of the tank 100a and the tubular element 108.

Protrusions 111a and 111b can be provided on longitudinal opposite ends of the insert 110a. The protrusions 111a and 111b abut with side wall portions 114 of the body members 102a and 102b to prevent further movement of the insert 110a inside the chamber 104a of the first tank 100a.

The insert 110a of the first tank 100a can include a projection 130 projected from an inner surface of the insert 110a. An inner terminal 130a of the projection 130 is adapted to block an inlet opening of at least one channels such as a channel 134 of the tubular element 108 to prevent ingress of the fluid. For instance, the channel 134 can be a central channel, which can be arranged between the first set of channels 136 and the second set of channels 138 of the tubular element 108. An outlet opening of the channel 134 can be blocked to prevent ingress of the fluid. In addition, air in the channel 134 can act as a thermal insulator between the adjacent two channels of the channel 134.

For instance, the inner terminal 130a of the projection 130 can be wedge-shaped or can be pointy, which can be received in the inlet opening of the channel 134 to block the inlet opening. In another embodiment, the inner terminal 130a of the projection 130 can have any suitable shape or profile corresponding to the inlet opening of the channel 134 to block the inlet opening. For instance, the inner terminal 130a of the projection 130 can be rectangular which can abut with the channel 134 to block the inlet opening of the channel 134, thereby preventing ingress of the fluid in the channel 134.

Further, the projection 130 of the insert 110a is adapted to divide the chamber 104a of the first tank 100a into a first sub-chamber 104a-1 and a second sub-chamber 104a-2. The first sub-chamber 104a-1 is configured in fluidic communication with the first opening 120 through which the fluid ingress in the first sub-chamber 104a-1, and further the collected fluid in the first sub-chamber 104a-1 is simultaneously distributed to the first set of channels 136. Whereas the second sub-chamber 104a-2 is configured to collect fluid from the second set of channels 138. The second sub-chamber 104a-2 is configured in fluidic communication with the second opening 122 through which the fluid egress from the second sub-chamber 104a-2.

In addition, the projection 130 can include a pair of concave surfaces 130b and 130c on opposite sides along length of the projection 130. The concave surfaces 130b and 130c are adapted to direct/guide the fluid to and from the first opening 120 and second opening 122. In addition, a gap 131 can be provided between convex surfaces of the projection 130 of the insert 110a and the hanging portion 124.

Figure 6:
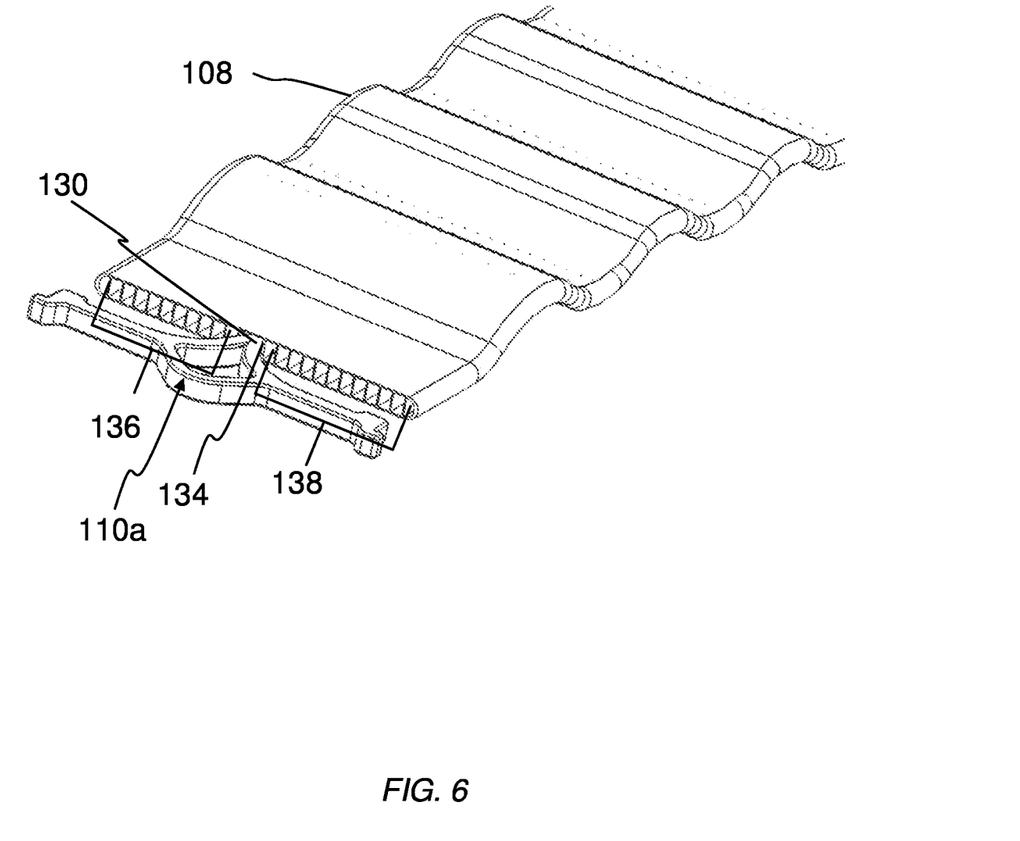
FIG. 6 illustrates an assembly of an insert of the first tank and the tubular element of the tank and tube assembly.

The first set of channels 136 and the second set of channels 138 allow the fluid to circulate in opposite directions to facilitate U-flow of the fluid. Further, the second tank 100b can act as a return tank, which returns or deviates the fluid circulating through the first set of channels 136 into the second set of channels 136 to enable the fluid to follow the U-flow patch in the tubular element 108.

Figure 7:
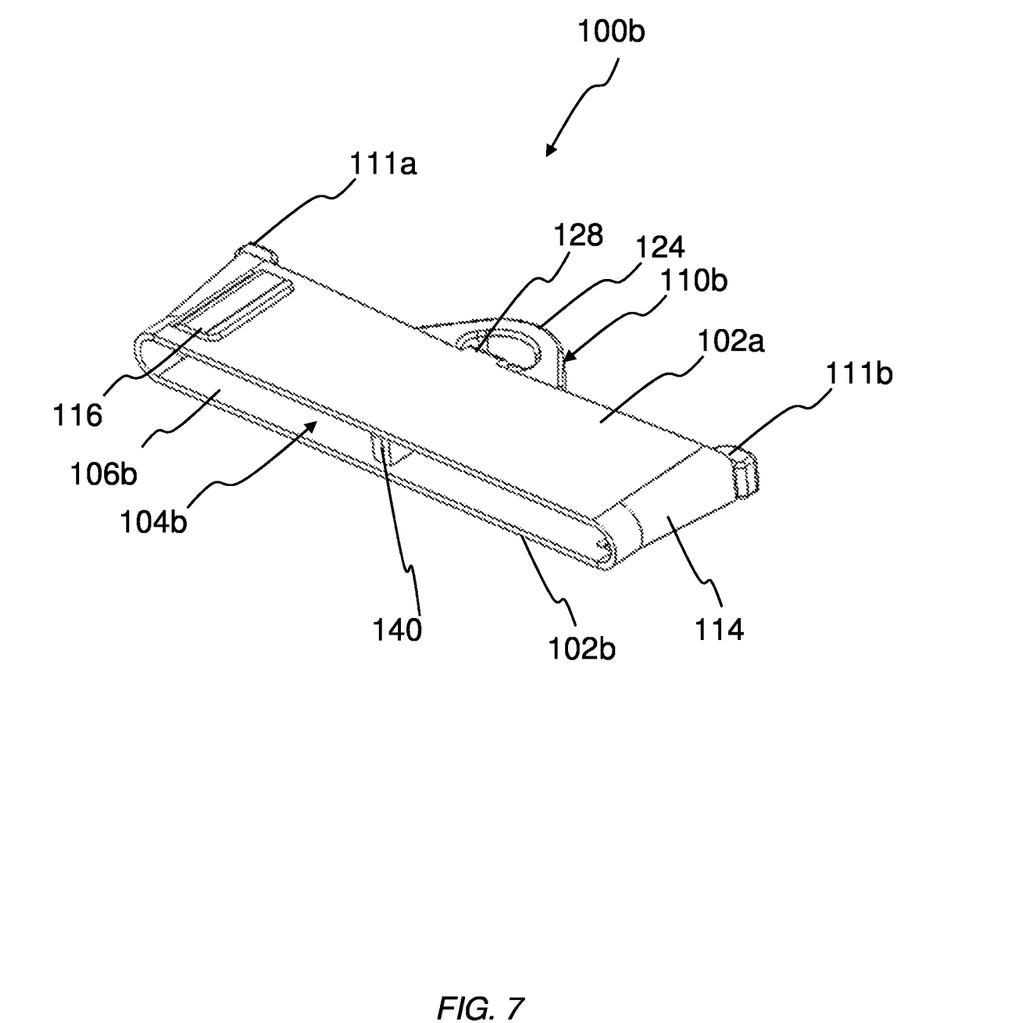
FIG. 7 illustrates an isometric view of a second tank of the tank and tube assembly of FIG. 1.
Figure 8:
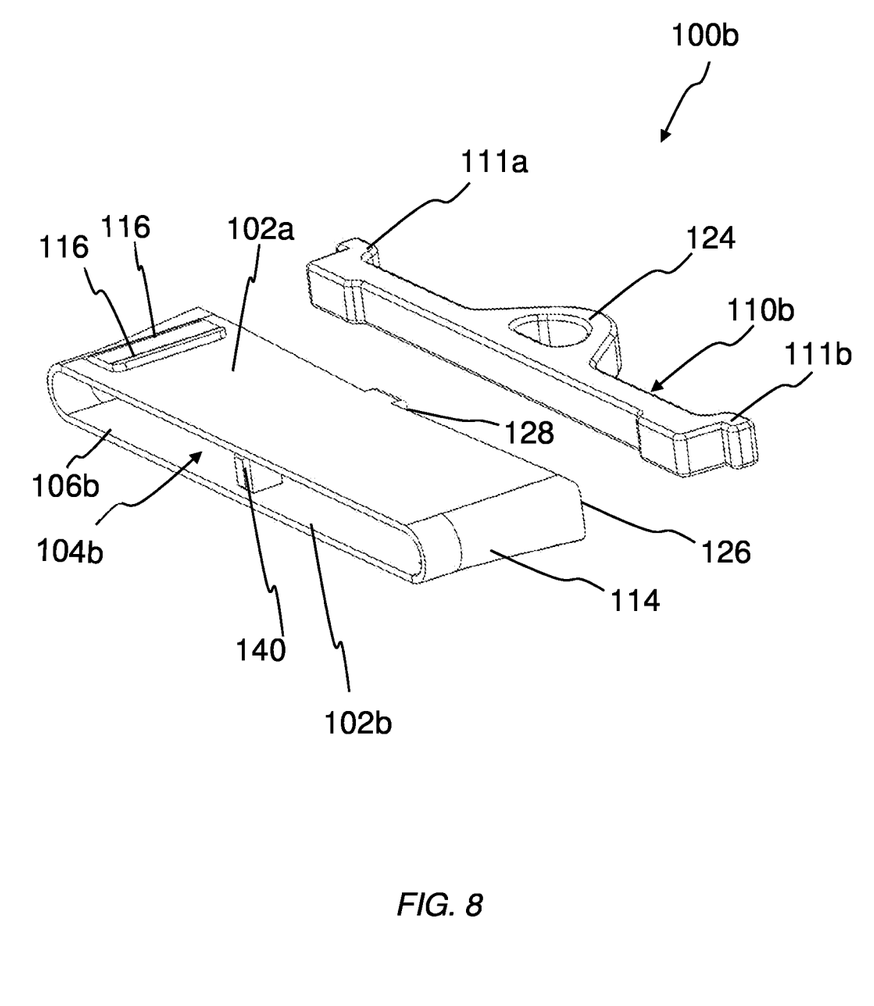
FIG. 8 illustrates a first exploded view of the second tank.
Figure 9:
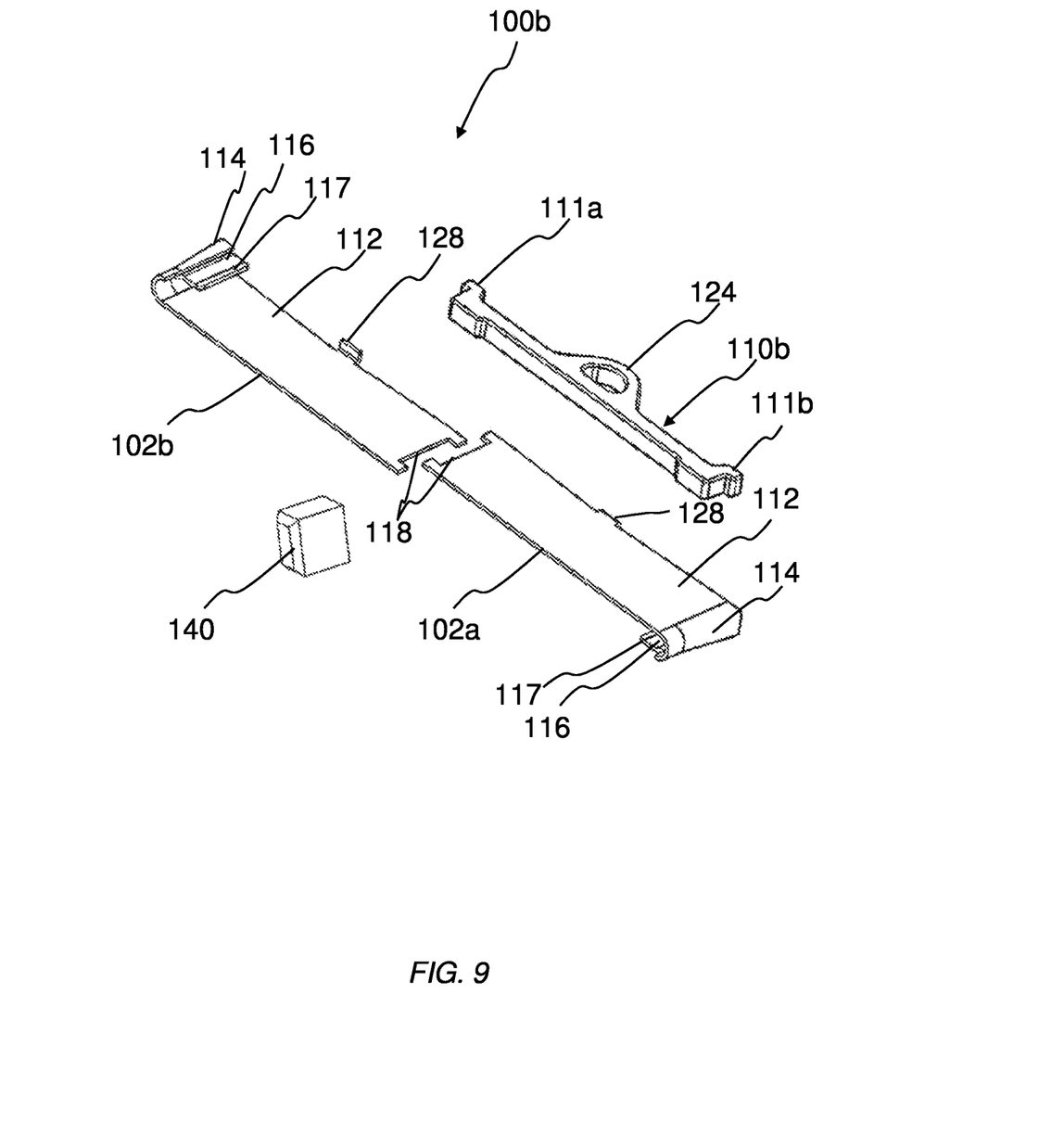
FIG. 9 illustrates a second exploded view of the second tank.

As shown in FIG. 7 to FIG. 9, similar to the first tank 100a, the second tank 100b also includes two body members 102a and 102b, which are coupled to each other to define a chamber 104b with an connecting opening 106b at an inner end of the second tank 100b, and an insert 110b that is configured between the two body members 102a and 102b at an outer end to seal the chamber 104b from one side, such as an outer end side. The connecting opening 106b of the second tank 100b is adapted to receive and securely hold the corresponding return end of the tubular element 108. In addition, the chamber 104b of the second tank 100b and the plurality of channels 136 and 138 of the tubular element 108 are fluidically connected through the connecting opening 106b such that the fluid flowing through the first set of channels 136 is collected in the chamber 104b and further the fluid is directed/supplied to the second set of channels 138.

In an embodiment, the second tank 100b can be coupled to the tubular element 108 though a suitable joining process, such as but not limited to, a brazing process. In addition, inner surfaces of the body members 102a and 102b can be flux coated.

Further, each of the body members 102a and 102b includes a panel portion 112, and at least one side wall portion, such as a wall portion 114 extended from an end of the panel portion 112. The sidewall portion can be substantially U-shaped. In addition, each sidewall portion 114 can be tapered such that the width of the sidewall portion 114 decreases along a longitudinal axis of the tubular element from the outer end to the inner end that is coupled to the tubular element 108, i.e., the width of the second tank 100b is smaller at the inner end, that is coupled to the tubular element 108, than the width at the outer end of the second tank 100b. In another words, the width of each body member 102a and 102b gradually decreases from the outer end to the inner end, this gradually reduces width of the second tank 100b towards the inner end from the outer end.

Furthermore, each of the two body members 102a and 102b of the second tank 100b includes a locking projection 116 projected from the corresponding side wall portion 114 and a slot 118 created at a free end portion of the panel portion, wherein the slot 118 is located at the end opposite to the side wall portion 114. In addition, the locking projection 116 of one of the two body members 102a and 102b is adapted to engage with the slot 118 of the other of the body members 102a and 102b to connect the two body members 102a and 102b of the second tank 100b.

In addition, the locking projections 116 and the slots 118 of the body members 102a and 102b can be configured to enable snap-fit locking therebetween to lock the two body members 102a and 102b. This snap-fit locking between the two body members 102a and 102b can help to keep them in place before the joining process, such as but no limited to, the brazing process, thereby maintaining the required shape of the second tank 100b till joining of the second tank 108 and the tubular element 108.

In an embodiment, the locking projection 116 of each of the body member 102a and 102b can be biased inwardly, i.e. towards the inner surface of the respective panel portion 112 or an axis extending towards the chamber 104 and is perpendicular to a longitudinal axis as well as the transverse axis of the second tank 100b, in order to enable press locking between the two body members 102a and 102b after engagement between the corresponding locking projection 116 and the slot 118 of the two body members 102a and 102b.

In another embalmment, as shown in FIG. 8, a leading free end 117 of the locking projection 116 of each of the body members 102a and 102b can be bent outwardly, i.e. away from the outer surface of the tank 104b or along an axis extending away from the chamber 104 and is perpendicular to a longitudinal axis as well as the transverse axis of the tank second 100b, in order to facilitate ease of being slid into a locking position with respect to the slot 118 of the two body members 102a and 102b, this can reduce the effort required during assembly of the second tank 100b.

In an embodiment, as shown in FIG. 8 and FIG. 9, the insert 110b of the second tank 100b can be a separate part with respect to the two body members 102a and 102b and can be adapted to be fitted in an outer side opening 126 defined between the two body members 102a and 102b at the outer end. Each of the body members 102a and 102b can be provided with one or more flexible tabs such as a flexible tab 128 to secure the insert 110b inside the chamber 104a or with the respective body member after the insert 110b is fitted through the outer side opening 126 between the two body members 102a and 102b. Flexibility of the tab 128 allows bending and unfolding of the tab 128 to, respectively, secure and release the insert 110b with the two body members 102a and 102b.

Further, the insert 110b of the second tank 100b is provided a hanging portion 124 extended outwardly away from the tubular element 108. The hanging portion 124 can be used as a fixing feature to ensure the proper alignment of the second tank 100b with the tubular element 108. It can be used as a hanging feature, e.g. when a dielectric coating is applied on outer surfaces for electric insulation from the batteries. In addition, a dielectric coating can be applied on outer surfaces of the hanging portion 124 for electric insulation to isolate the hanging portion 124 from the batteries.

Besides, protrusions 111a and 111b are provided on longitudinal opposite ends of the insert 110b, the protrusions 111a and 111b abut with side wall portions 114 of the body members 102a and 102b to prevent further movement of the insert 110b inside the chamber 104b of the second tank 100b.

Figure 10:
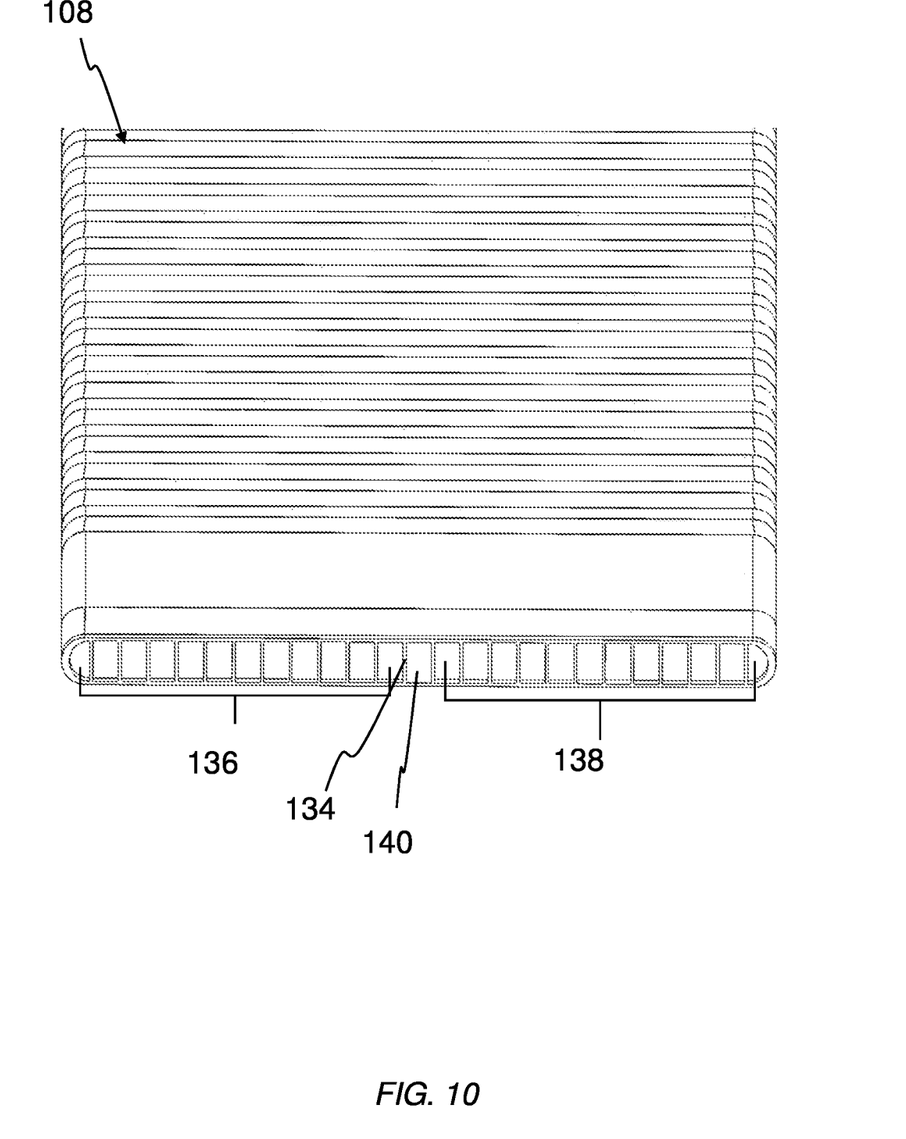
FIG. 10 illustrates the tubular element with a plurality of channels, where an outlet of a central channel is blocked.

In an embodiment, a blocking element 140 can be adapted to block an outlet opening of the channel 134 of the tubular element 108. As show in FIG. 7 and FIG. 8, the blocking element 140 can be configured between the body members 102a and 102b through the connecting opening 106b of the second tank 100b. The blocking element 140 can have a shape/profile corresponding to the outlet opening of the channel 134 to block an outlet opening. In addition, a portion of the blocking element can be received in the outlet opening of the channel 134 to block an outlet opening, as shown in FIG. 10. The blocking element 140 can designed of any suitable shape/profile, such as but not limited to, squire shape, wedge shape etc. based on required.

In any case, the invention cannot and should not be limited to the embodiments specifically described in this document, as other embodiments might exist. The invention shall spread to any equivalent means and any technically operating combination of means.

What is claimed is:

1. A tank for a tubular element of a heat exchanger, the tank comprising:
   two body members coupled to each other to define a chamber with at least one connecting opening adapted to form connection between the tank and the tubular element of the heat exchanger; and
   an insert located between the two body members to seal the corresponding chamber from one side,
   wherein the insert includes at least one protrusion adapted to abut with at least one member of the two body members to prevent further movement of the insert inside the chamber of the tank,
   wherein at least one of the two members includes a flexible tab configured to releasably secure the insert within the chamber, and
   wherein each of the body members includes a locking projection at one end and a slot at an opposite end, the two body members configured such that the locking projections are removably engaged with the slots to secure the two members together.

2. The tank as claimed in claim 1, wherein the at least one connecting opening of the tank is adapted to receive and securely hold a corresponding end of the tubular element of the heat exchanger.

3. The tank as claimed in claim 1, wherein each of the two body members includes:
   a panel portion; and
   at least one side wall portion extended from an end of the panel portion.

4. The tank as claimed in claim 3, wherein each of the two body members further includes the locking projection projecting from the at least one side wall portion and the slot present at a free end portion of the panel portion opposite to the at least one side wall portion.

5. The tank as claimed in claim 1, wherein the locking projections and the slots of the two body members are configured to enable snap-fit locking therebetween.

6. The tank as claimed in claim 1, wherein the locking projection of each of the two body members is inwardly biased to enable press locking between the two body members after engagement between the corresponding locking projections and the slots of the at least two body members.

7. The tank as claimed in claim 6, wherein a leading free end of the locking projection of each of the at least two body members is bent outwardly to facilitate ease of being slid into a locking position with respect to the corresponding slot of the two body members.

8. The tank as claimed in claim 1, wherein at least one body member of the two body members includes a first opening for ingress of fluid with respect to the chamber of the tank.

9. The tank as claimed in claim 1, wherein the insert includes a hanging portion extending outwardly away from the two body members.

10. The tank as claimed in claim 1, wherein a dielectric coating is applied on outer surfaces of the tank.

11. The tank as claimed in claim 1, wherein the insert is a separate part with respect to the two body members and is fitted through an outer side opening defined between the two body members, opposite to the at least one connecting opening.

12. The tank as claimed in claim 1, wherein the insert includes a projection facing towards the chamber, and wherein a free inner terminal of the projection is pointy.

13. The tank as claimed in claim 12, wherein the projection of the insert is further configured to divide the chamber of the tank into a first sub-chamber and a second sub-chamber.

14. The tank as claimed in claim 13, wherein the projection includes a pair of concave surfaces on opposite sides to direct the fluid within the tank.

15. A tank and tube assembly for a heat exchanger, the tank and tube assembly comprising:
a tubular element including a plurality of channels including a first set of channels and a second set of channels; and
one tank coupled to at least one end of the tubular element;
wherein each of the at least one tanks includes:
two body members coupled to each other to define a chamber with at least one connecting opening configuring fluidic communication between the chamber and the plurality of channels of the tubular element; and
an insert configured between the two body members to seal the corresponding chamber from at least one side,
wherein the insert includes at least one protrusion adapted to abut with at least one member of the two body members to prevent further movement of the insert inside the chamber of the tank,
wherein at least one of the two members includes a flexible tab configured to releasably secure the insert within the chamber, and
wherein each of the body members includes a locking projection at one end and a slot at an opposite end, the two body members configured such that the locking projections are removably engaged with the slots to secure the two members together.

16. The tank and tube assembly as claimed in claim 15, wherein one of the two body members of the tank includes a first opening for ingress of fluid with respect to the chamber of the tank.

17. The tank and tube assembly as claimed in claim 15, wherein the insert of the at least one tank includes a projection facing towards the chamber, adapted to block an inlet opening of at least one channel of the tubular element, wherein the at least one channel is arranged between the first set of channels and the second set of channels of the tubular element.

18. The tank and tube assembly as claimed in claim 16, wherein the insert of the at least one tank includes a projection facing towards the chamber, adapted to block an inlet opening of at least one channel of the tubular element, wherein the at least one channel is arranged between the first set of channels and the second set of channels of the tubular element, wherein the other of the at least two body members of the tank includes a second opening for egress of fluid with respect to the chamber of the tank, wherein the first set of channels and the second set of channels allow the fluid to circulate in opposite directions to facilitate U-flow of the fluid.

19. The tank and tube assembly as claimed in claim 17, wherein the projection of the insert is further configured to divide the chamber of the at least one tank into a first sub-chamber and a second sub-chamber, wherein the first sub-chamber is configured to distribute the fluid to the first set of channels and the second sub-chamber is configured adapted to collect fluid from the second set of channels.

* * * * *